April 7, 1970 L. TRIPLETT 3,504,498
SHAFT SECUREMENT STRUCTURE
Filed July 26, 1968 2 Sheets-Sheet 1
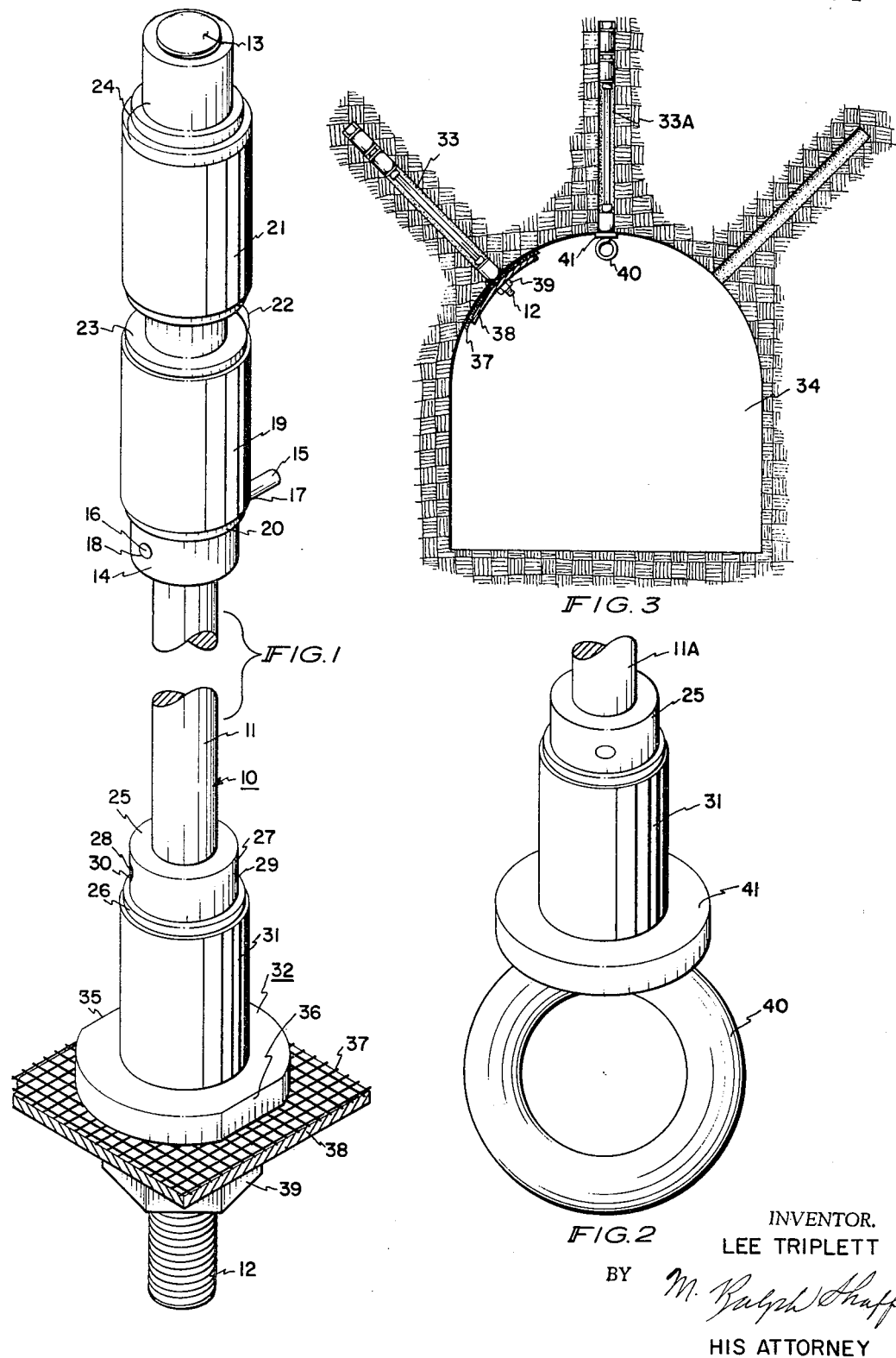
INVENTOR.
LEE TRIPLETT
BY M. Ralph Shaffer
HIS ATTORNEY

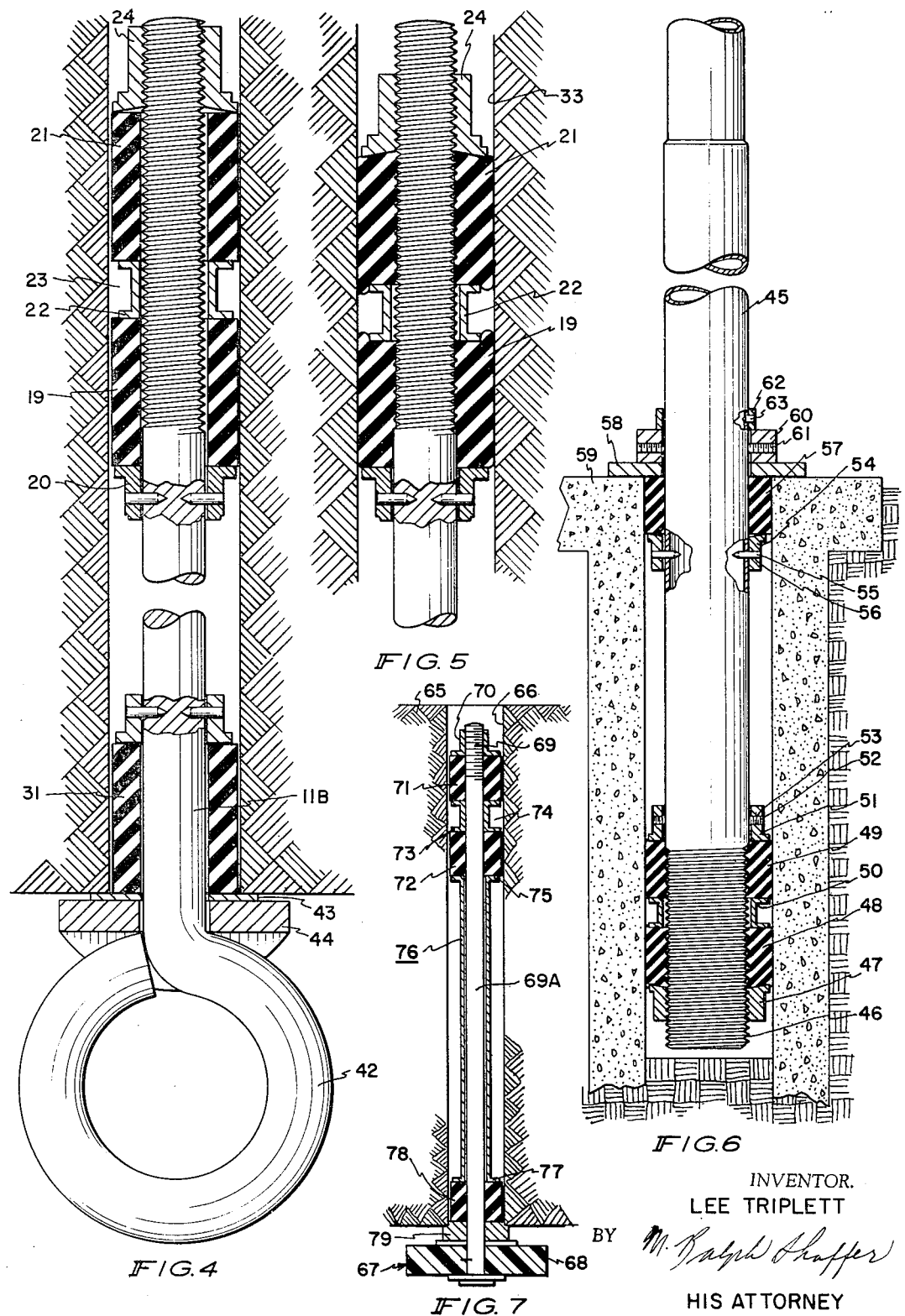

United States Patent Office 3,504,498
Patented Apr. 7, 1970

3,504,498
SHAFT SECUREMENT STRUCTURE
Lee Triplett, 2378 South 8600 West,
Salt Lake County, Utah
Filed July 26, 1968, Ser. No. 748,065
Int. Cl. E21d 11/00; F16b 13/06
U.S. Cl. 61—45      3 Claims

ABSTRACT OF THE DISCLOSURE

The present invention relates to shafts which are to be secured in a variety of structures, for example, mining formations, drill holes, casings, and the like, and is directed to a suitable, elongate shaft construction incorporating compression-lock friction sleeves at a remote end thereof which can be compressed and thereby expanded in a formation simply by rotating the shaft at a remote point relative to the compression sleeves. In a preferred embodiment of the invention, a stabilizing bushing is employed near the entrance to the formation or drill hole, this so that forces in shear against the shaft and proximate the exterior of the bore of which the shaft is mounted, cannot dislodge a compression-friction lock of the shaft within the bore.

---

The present invention relates to shaft constructions which are securable to and within formation bores, drill holes, and the like, and, more particularly, provides a new and improved shaft construction which, by rotation of suitable means disposed exterior of the bore, the shaft may be rotated and automatically produce a compression-type friction-lock within the bore in which the shaft is disposed. In a preferred form of the invention, a stabilizing bushing is disposed on the shaft proximate the entrance of the bore so as to stabilize the shaft construction and its mounting relative to forces in shear which are applied thereto.

The present invention comprises an elongate shaft construction which is securable in an elongate bore of external structure such as a mine shaft, merely by way of example. The elongate shaft construction includes an elongate shaft with an elastomeric sleeve and an elastomeric bushing spacedly mounted upon said shaft. Nut means backs the elastomeric sleeve, and spacer means is incorporated between the sleeve and bushing for remotely separating the two. Rotating means supplied the shaft expands the sleeve, as well as the bushing, since when the shaft is rotated thereby the nut means aforementioned will tighten so as to compress and hence expand outwardly the elastomeric sleeve and bushing.

Accordingly, a principal object of the present invention is to provide a new and improved shaft construction for mounting in a variety of bores, e.g. drill holes, mine shaft bores, and casings whereby to produce a friction compression-lock within the bore so that the shaft can be securely mounted to and possibly supported by the bore formation or construction.

A further object of the invention is to provide a new and improved mine bolt for securing plates or supporting other structures to a mine formation.

An additional object is to provide an improved means for securing an elongate shaft to any one of several structures having corresponding bores to receive the shaft.

An additional object is to provide a stabilizing bushing in a shaft construction whereby excessive displacements of the shaft are avoided proximate the bore entrance of the bore receiving shaft, this so that there substantially is no likelihood of dislodgement of the securing mechanism of the shaft relative to the bore within which it is placed.

An additional object is to provide mine bolt and shaft means which are easily removeable and replaceable relative to the structures in which they may be releasably mounted.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a fragmentary perspective of a mine bolt incorporating the features of the present invention.

FIGURE 2 is a perspective view of a lower portion of a mine bolt similar to FIGURE 1, but wherein the lower end portion thereof has been slightly modified.

FIGURE 3 is a transverse, vertical cross-section of a mine tunnel which incorporates certain structure of the present invention.

FIGURE 4 is a transverse, longitudinal cross-section of a mine bolt incorporating the structure of FIGURE 1.

FIGURE 5 illustrates the cross-section of the uppermost portion of the mine bolt structure in FIGURE 4, wherein rotation of the mine bolt produces a compression, friction-lock of the mine bolt structure within the formation bore.

FIGURE 6 is an elevation, principally in transverse section, of a shaft frictionally-locked within the bore of cementitious structure, for example; in FIGURE 6 it will be understood that the casement formation will vary for various types of uses of the shaft of the present invention, and that the shaft can be used in accordance with the teachings of FIGURE 6 in introducing, withdrawing, or simply mounting various types of objects to various types of formations, either naturally occurring or artificially produced.

FIGURE 7 is a longitudinal section of an alternate shaft construction incorporating the principles of the present invention.

In FIGURE 1 the mine bolt 10 of the present invention includes a shaft 11 which has its opposite extremities at 12 and 13 threaded as indicated. A collar or reaction means 14 is secured to or made integral with shaft 11 by set screws or, preferably, drive pins 15 and 16 which are pressed into respective collar apertures 17 and 18 and driven home into shaft 11. An elastomeric compression sleeve 19 is disposed over shaft 11 and abuts the collar 14. Collar 14 may include a flange 20, serving as an abutment for the compression sleeve 19.

Compression sleeve 21 is also preferably utilized, is mounted over shaft 11; disposed between the two sleeves 19 and 21 is a spacer 22 provided with annular gap 23. Annular gap 23 may be used, if desired, as a relief area for accommodating the flow of the material of sleeves 19 and 21 upon their compression. The annulay gap 23 will assume less importance, and may conceivably even be eliminated, if the compression sleeves are reinforced with tubular, fibrous web such as a web made of nylon, rayon, and so forth. However, plural, spaced sleeves are preferred over a long single sleeve, since required compressive frictional forces can be applied over a given length in a lesser number of turns of the bolt or shaft.

Backing the two sleeves and spacer 22 is a nut 24 which is threaded onto threaded end portion 13 of shaft 11.

The lowermost portion of the mine bolt is made up as follows. Collar or reaction means 25 includes a reaction flange 26 and is provided with securement means for affixing the collar securely to the shaft to make the same integral therewith. This, again, may comprise one or more set screws or, preferably, drive pins 27 and 28 which are pressed into apertures 29 and 30 and driven home into the shaft. A stabilizing bushing 31 is also preferably included, is preferably elastomeric and/or resilient in general construction, and is disposed immediately underneath and abuts collar 25. A retainer collar 32 may be threaded onto the threaded portion of shaft 10, or otherwise secured to the shaft, and directly abuts, preferably in a slight pre-load relationship, the stabilizing bushing 31.

In installation, the mine bolt of FIGURE 1 is preloaded slightly by the user simply turning down on nut 24 so that a slight compression pre-load exists relative to compression sleeves 19 and 21. The mine bolt 10 is then inserted into a drilled bore 33 associated with mine shaft 34.

Numerous ways and means may be provided for turning the shaft 11 and the structure mounted thereof within the bore 33. For example, wrench flats may be supplied at 35 and 36 relative to collar 32, and the user can simply turn by a suitable wrench the collar 32. This, in turn, will rotate the entire shaft, except for sleeves 19 and 21. The frictional engagement of the latter with respect to bore 33 and the material thereof will retain these in fixed condition and, by virtue of the frictional engagement sleeve 21 with nut 24, will prevent the latter from rotating also in the presence of rotation of shaft 11.

The continued rotation of shaft 11 as through the rotational displacement of collar 32, by means of a conventional or even a spanner wrench, crowbar, or other suitable means, will gradually compress the sleeves 19 and 21, tending to expand the same outwardly to further grippingly engage the wall of bore 33. Any overlap in sleeve material will be accommodated by annular gap 23 in spacer 22.

Once the mine bolt is installed, suitable, conventional wire mesh 37 can be disposed over the threaded portion 12 and the latter retained in place by mine plate 38. In the art, the "mine plate" 38 is customarily referred to as boiler plate. For purposes of the specification and claims herein, simply the term "mine plate" will be used.

The purpose for the inclusion of the conventional wire mesh 37 is to keep elements of the formation from dropping into the mine tunnel. Plate 38 serves, in effect, as a retainer for the wire or screen mesh so that the former will be held securely against the wall of the tunnel or shaft. Once the plate 38 is installed, suitable nut means 39 will be provided and tightened down onto the plate to rigidly secure the plate and wire mesh against the formation.

FIGURE 2 is a slight modification of the structure in FIGURE 1, indicating that the lower portion thereof may simply include an eye 40 and collar or collar shoulder 41 which are integrally formed with or otherwise affixedly secured to shaft 11A, corresponding to shaft 11 in FIGURE 1. In the case of FIGURE 2, the eye or rotation facilitating means 40, in being integral with shaft 11A, may be simply turned by a simple bar so as to provide the compression of sleeves 19 and 21 in FIGURE 1 to produce the frictional securement thereof to bore 33A in FIGURE 3.

In FIGURE 4, the shaft 11B is substantially the same as shaft 11 in FIGURE 1, excepting that in the embodiment of FIGURE 4 the eye or rotation facilitating means 42 is an integrally formed lower portion of shaft 11B; in addition, a washer 43 and saddle-type retainer 44 are utilized.

It will be understood, of course, that the structure in FIGURE 4 can be used to retain wire mesh and plates as indicated in connection with FIGURES 1 and 3. Most preferably, however, the eye bolt type of mine bolt will be employed simply for supporting various types of equipment such as slusher equipment, chain blocks, cables, and so forth in various mine laterals, stopes, and so forth.

FIGURE 5 illustrates the condition of the aft portion of the mine bolt when the shaft 11, 11A, or 11B is rotated as is indicated in FIGURE 5. In such event, there is a marked compression and corresponding radial expansion of the sleeves 21 and 19, so as to effect a secure friction-lock of the sleeves within bore 33, for example. Of course, when it is desired to release the mine bolt from the formation, the same is merely rotated in an opposite direction so as to relieve a compression pressure upon the compression sleeves 19 and 21. Resilient stabilizing bushing 31, preferably formed of elastomeric material, reduces angular displacements of the shaft's axial alignment within the bore and thus tends to stabilize the longitudinal orientation of the mine bolt within the bore of the formation. Frequently, substantial loading in shear is applied to the bolt below collar 32. Often time, these forces will tend actually to dislocate any formation-gripping device used in connection with the bolt. The present invention, however, avoids this difficulty by providing a bushing, preferably a resilient bushing, to take up at a reaction means these forces that are applied, and in preventing their affecting the securement mount of the mine bolt to the shaft. This principle of utilizing such a bushing will be applicable to all types of bolt and shaft constructions used, whether or not the friction-lock sleeves 19 and 21 are also utilized.

FIGURE 6 illustrates another embodiment of the invention wherein a hollow shaft 45 is threaded at 46 to accommodate the threaded securement there to a nut 47. Elastomeric compression sleeves 48 and 49 are spaced apart by spacer 50, and the entire assembly is backed by collar 51 which is secured in place by set screws 52 passing through suitably threaded apertures 53 thereof. Compression sleeves 48 and 49 may be chosen to correspond with compression sleeves 19 and 21 in FIGURE 4, whereas spacer 50 may correspond to spacer 22 in FIGURE 4.

In proceeding upwardly, we find the presence of a collar 54 which may be secured by set screws or drive pins 55 to the shaft 45. Suitable apertures 56 will be provided for this purpose. A stabilizing bushing 57 is mounted over the shaft 45 as indicated, and a washer or plate 58 is disposed above ground against the casing 59 and is secured in place by collar 60. Collar 60 may be secured by set screws 61 to the hollow shaft 45, or other means may be suitably provided so as to assure a tight sealed fit, if required, at the upper portion of casing 59.

The structure here operates substantially identically to that described in the previous figures. Suitable means for turning the hollow shaft 45 may be supplied as through the provision of a multi-sided boss 62 secured by means 63 to the hollow shaft 45.

The application of a spanner wrench or of any other suitable means can be used to rotate the hollow shaft 45 to produce a loaded compression of compression sleeves 48 and 49, and this by virtue of the fact that nut 47, in being threaded onto part 46, will enjoy a greater frictional retention as between it and compression sleeve 48 than with the metal threaded surface of shaft end 46.

Continued rotation of hollow shaft 45 will further increase the compression loading of compression sleeves 48 and 49 so as to provide a very secure and tight engagement of the shaft structure, at compression sleeves 48 and 49, with the casement 59.

In practicing the invention, the "casement" 59 may simply comprise ground or other formation in which a bore or aperture 64 has been provided. In other instances, the casement may in fact comprise a cement casement having a central aperture 64. The invention is ideal not only for structures such as poles, flag poles, and the like, but also is ideally suited for well drilling operations and especially for securing casement within well holes or for providing tubular means for introducing cement or other materials into drill holes for a variety of purposes such as plugging fissures, cementing casements and drill holes, providing mud systems, and so forth.

It will be observed that the structures shown in the various FIGURES 1–6 are useable in a variety of context, such as loading and unloading and supporting equipment and materials, introducing or withdrawing materials, fluids, and so forth in a variety of conditions, supporting various structures, including the mine formation itself by a variety of means, and all of this with the novel concept of providing a novel friction-lock and/or stabilizer construction for accomplishing the results intended. Where an eye-bolt structure is used it becomes very convenient to apply a substantial force of rotation to the bolt so that a desired securement of the mine bolt within the structure is achieved. Even where wrench flats are used, a customary long-wrench or spanner wrench can be employed to provide more than adequate torque in accomplishing the securement of the mine bolt within the formation bore. The structure of FIGURES 1–5 is particularly suitable in providing an eye-bolt hook or other means for supporting various structures to accomplish mine repairs of several varieties.

In FIGURE 7 member or formation 65 has a bore 66 receiving a sealing or mounting shaft device 67. The shaft device 67 is made up of turning means 68 and a threaded shaft 69A integral or otherwise keyed therewith. Conventional nut 70 is threaded onto the threaded end portion 69 of the shaft and backs axially compressible, radially expandable friction-lock sleeve 71. Sleeve 72 is of similar character and is separated from sleeve 71 by means of a spacer 73. The latter may be provided with material flow receiving gap 74; or the gap 74 may serve other purposes, as for example, simply spacing the sleeves 71 and 72 as indicated. Spacer sleeve 76 is flanged at both ends and hence includes end flange abutments 75 and 77 engaging sleeves 72 and 78, respectively. The additional sleeve or bushing 78 is similar to the sleeves 71 and 72, and all of the same are preferably composed of an elastomeric material such as neoprene. Shouldered bearing means 79 is provided and serves as a bearing for a turning device 68. The latter may comprise a handle, a nut having wrench flats, a wheel, or any other suitable turning device to be secured to shaft 69.

In operation, the device 67 will be inserted in bore 68 and the handle 68 rotated such that nut 70 is threadedly advanced toward the handle 68. This is easily accomplished through a slight manual pre-load being exerted upon nut 70 to compress slightly these sleeves 71, 73 and 78. By virtue of the high coefficient of friction between nut 70 and sleeve 71 and the engagement of the latter with the formation of member 65, the sleeve 71 with the remaining sleeves will tend to remain in fixed, non-rotative disposition. The metal-to-metal contact between shaft 69 and nut 70 is of reduced frictional character so that the rotation of shaft by handle means 68 will automatically produce a riding down or advancement of nut 70 upon shaft 69. This produces the simultaneous compression of sleeves 71, 72 and 78 so as to urge these latter outwardly to further frictionally engage the wall of bore 66. It will be noted that since there is a wide space between friction-lock compression sleeve 72 and friction-lock compression sleeve 78, but a few turns of the shaft will produce a high degree of expansive force of these and the remaining sleeve against the formation, and this by a relatively few turns of handle or turning means 68. Further, sleeve 78 serves as a stabilizing bushing so as to prevent forces in shear as applied to the handle 68 from tending to dislodge the friction-lock structure of device 67.

It will be observed that the construction will serve equally as well in the bore or other aperture of any type of material including metal, glass, plastics, and so forth. An unusually high mechanical advantage is obtained by virtue of the threaded engagement with nut 70 and a selected reduced pitch of the threads on shaft 69, so that a tremendous expansive force can be achieved by the sleeves for a limited few turns of handle or turning means 68 as produced, simply, even by hand pressure.

While particular embodiments of the present invention have been shown and described, it will be obvious to those skilled in the art that changes and modifications may be made without departing from this invention in its broader aspects.

I claim:
1. A device including, in combination, an elongate shaft, means for rotating said shaft affixed to one end thereof, said shaft having a threaded portion on the opposite end thereof, nut means operatively disposed upon said threaded end portion, axially compressible, radially expandable elastomeric friction-lock sleeve means operatively disposed upon said shaft and frictionally engaging said nut means, an axially compressible, radially expandable, elastomeric bushing also disposed upon said shaft, bearing means disposed between said bushing and said rotating means, and elongate, sleeve-like spacer means operatively disposed upon said shaft between said bushing and said friction-lock sleeve means, said friction-lock sleeve means and bushing being dimensioned to frictionally and lockingly engage said shaft and the sides of an external bore in which said device is to be placed.

2. Structure according to claim 1 wherein said elongate spacer means comprises a sleeve flange at both ends.

3. Structure according to claim 1 wherein said friction-lock sleeve means comprises a pair of friction sleeves, and spacer means disposed between said friction sleeves.

References Cited

UNITED STATES PATENTS

| 2,520,375 | 8/1950 | Roe | 85—69 X |
| 2,525,198 | 10/1950 | Beijl | 85—67 |
| 2,918,840 | 12/1959 | Roesler | 85—69 |
| 3,296,919 | 1/1967 | Williams | 85—73 |

FOREIGN PATENTS 40,335   11/1957   Poland.

DENNIS L. TAYLOR, Primary Examiner

U.S. Cl. X.R.

85—70